Figure 1:
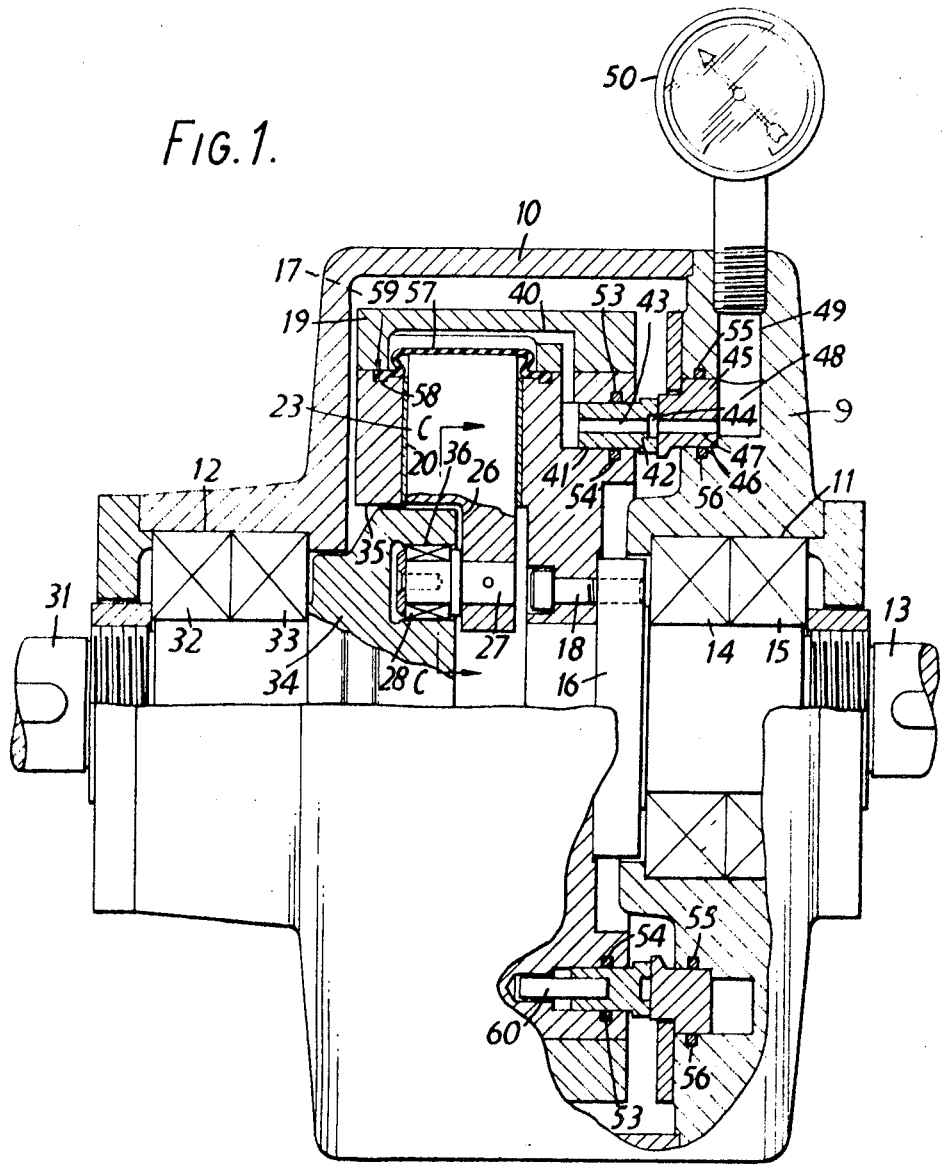

United States Patent

Blake et al.

[15] 3,664,474

[45] May 23, 1972

[54] TORQUE TRANSMITTING DEVICES

[72] Inventors: John Berchmans Blake, Preston; Roger Anderton Ashworth, Clitheroe, both of England

[73] Assignee: Allspeeds Holdings Limited, Accrington, Lancashire, England

[22] Filed: Feb. 18, 1970

[21] Appl. No.: 12,383

[30] Foreign Application Priority Data

Feb. 18, 1969 Great Britain..................8,807/69

[52] U.S. Cl. .....................192/56 F, 73/136 D, 192/59, 192/60
[51] Int. Cl.......................F16d 43/20, F16d 31/02
[58] Field of Search..................192/56 F, 59, 85 A, 60; 73/136 R, 136 D; 91/499; 64/29; 81/52.4, 52.5; 92/101

[56] References Cited

UNITED STATES PATENTS

| 2,244,185 | 6/1941 | Bakewell..........................81/52.5 UX |
|---|---|---|
| 2,408,501 | 10/1946 | Wright..................................192/56 F |
| 2,597,514 | 5/1952 | Nash......................................64/30 C |
| 3,108,471 | 10/1963 | Buchele et al. ......................73/136 D |
| 2,546,062 | 3/1951 | Ernst .....................................192/59 |
| 3,274,896 | 9/1966 | Terho ..................................91/499 X |
| 3,419,117 | 12/1968 | Conway...............................192/56 F |
| 3,527,329 | 9/1970 | Jordan ................................192/85 A |
| 2,546,403 | 3/1951 | Pendleton..............................92/101 |

FOREIGN PATENTS OR APPLICATIONS

| 544,230 | 4/1942 | Great Britain.............................64/29 |
|---|---|---|
| 956,654 | 1/1957 | Germany.....................................64/29 |
| 405,429 | 2/1934 | Great Britain...........................192/59 |
| 592,093 | 4/1925 | France......................................192/59 |
| 623,679 | 8/1961 | Italy..........................................192/60 |

*Primary Examiner*—Allan D. Herrmann
*Attorney*—Young & Thompson

[57] ABSTRACT

A torque transmission device consists of a resilient coupling between two shafts. The resilient coupling comprises an assembly mounted on one shaft and provided with a plurality of cylinders each having a piston and a cam arrangement mounted on the other shaft and controlling the piston as regards movement in their respective cylinders upon angular displacement between the two shafts under load conditions. A fluid-filled passage connects the cylinder heads with an outlet for indication or control purposes. The cylinders may be arranged radially with respect to the shaft axes or parallel thereto. A suitable indicating instrument may be connected to the outlet for torque sensing and the device may also be used for torque limiting by connecting to the outlet, means, for instance a metallic bellows, which, at a predetermined value of fluid pressure, increase the volume occupied by the fluid. In addition, the device may be used as a fluid clutch by the provision of manually-operated means for increasing the volume occupied by the fluid.

10 Claims, 8 Drawing Figures

PATENTED MAY 23 1972 3,664,474

SHEET 2 OF 5

INVENTORS
JOHN BERCHMANS BLAKE
ROGER ANDERTON ASHWORTH
BY Young + Thompson
ATTYS.

PATENTED MAY 23 1972

3,664,474

SHEET 5 OF 5

INVENTORS

JOHN BERCHMANS BLAKE
ROGER ANDERTON ASHWORTH

By Young & Thompson
ATTYS

TORQUE TRANSMITTING DEVICES

The present invention relates to a torque transmission device which is capable of a number of different applications, such as, for example, to torque sensing, to torque limiting and to fluid clutches.

Torque transmission devices are well known and in their application to torque sensing usually consist of a fluid-filled coupling having a degree of flexibility, the coupling being arranged between a driving and a driven shaft. Different types of coupling have been proposed, some of which are of considerable complexity and consequent high cost.

The object of the present invention is to provide a torque transmission device which is not only efficient in operation but in which the coupling is of comparatively simple and robust construction.

According to the invention, in a torque transmission device having resilient coupling means responsive to angular displacement between a first and a second shaft under load conditions for giving an indication of applied torque the coupling means comprises an assembly provided with one or more cylinders having or each having a piston, the assembly being attached to said first shaft and a cam arrangement attached to said second shaft and controlling the piston or pistons as regards movement in the or their respective cylinders upon angular displacement between the two shafts, a fluid-filled passage in the assembly connecting the cylinder head or heads with an output for indication or control purposes.

Figure 2:
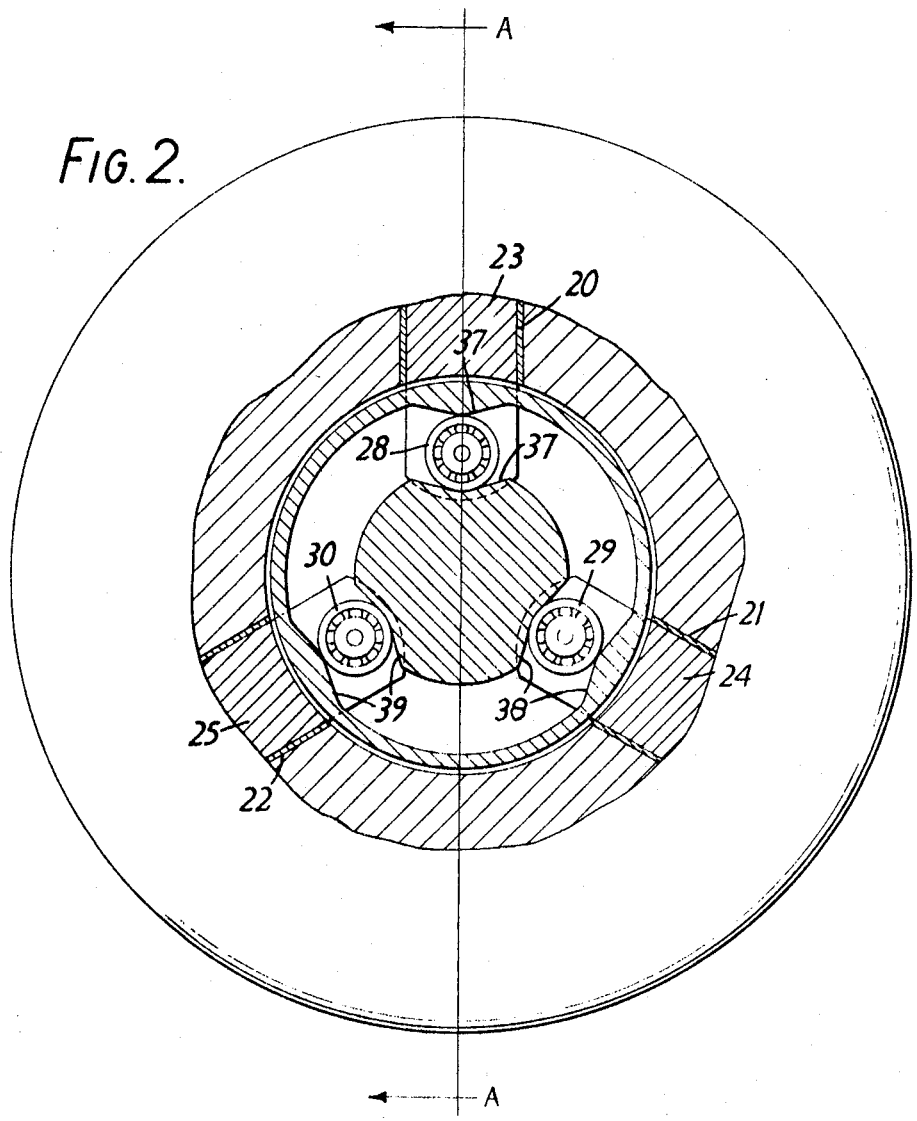
Figure 3:
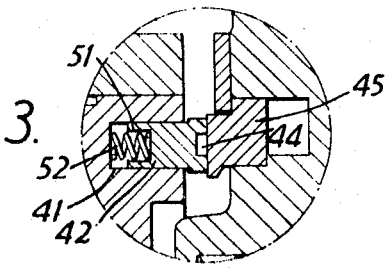
Figure 4:
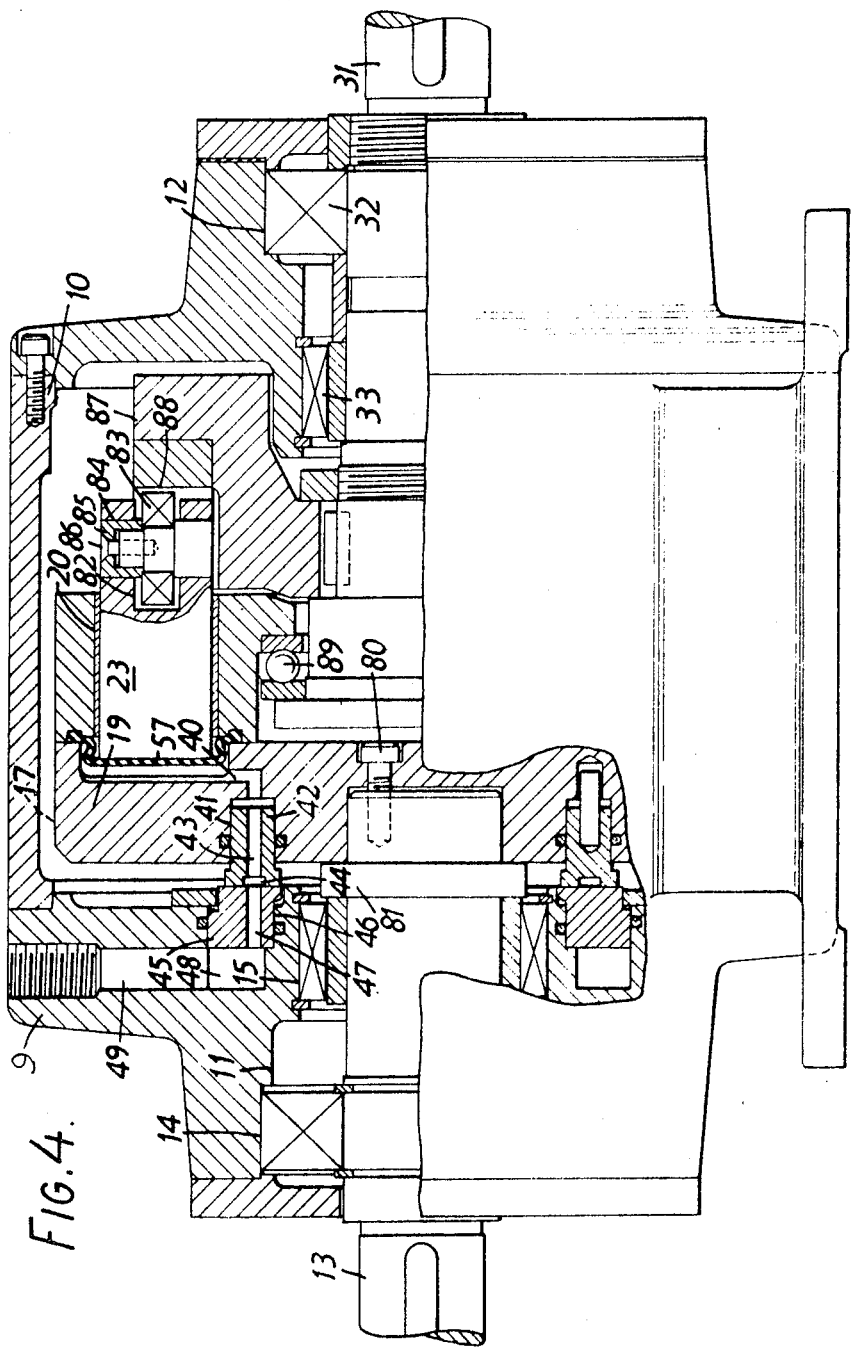
Figure 5:
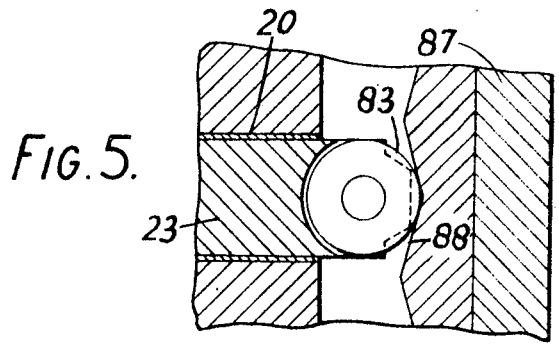
Figure 6:
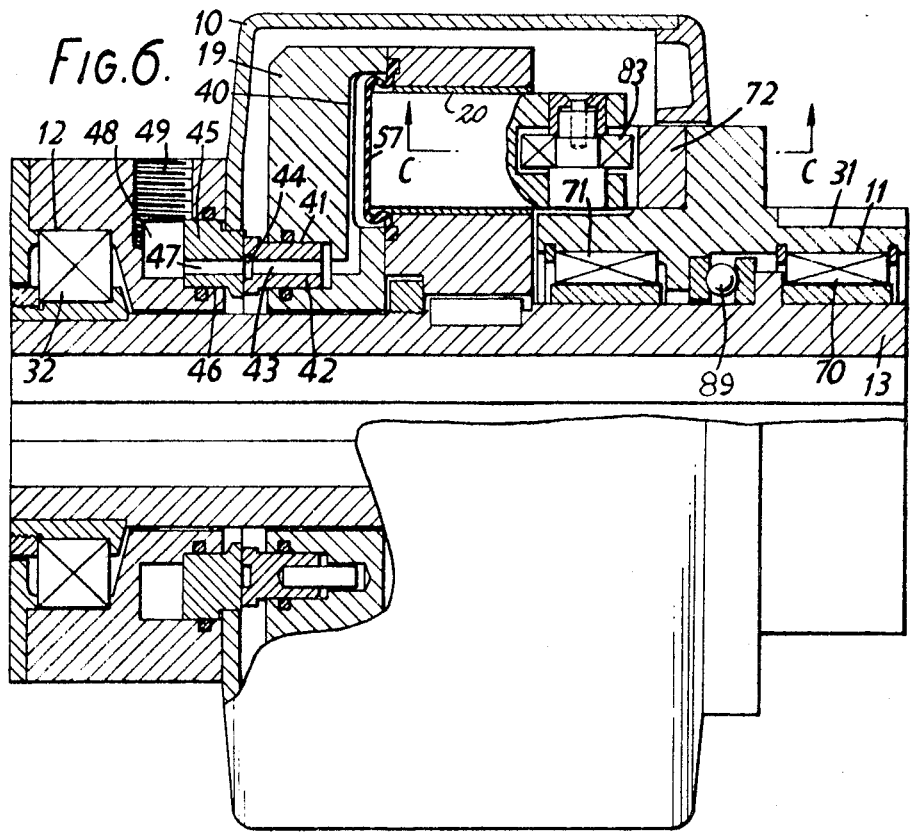

The invention will be better understood from the following description of a number of embodiments taken in conjunction with the accompanying drawings comprising FIGS. 1-8. Of the drawings FIG. 1 shows a part-sectional view of one embodiment of the torque transmission device along the line A—A of FIG. 2, in which the cylinders are arranged radially with respect to the axes of the driving and driven shafts, FIG. 2 shows a part-sectional end elevation of the device along the line C—C of FIG. 1, FIG. 3 shows a sectional view of a detail of the device, FIG. 4 shows a part-sectional view of another embodiment of the device in which the cylinders are arranged parallel to the axes of the driving and driven shafts, FIG. 5 shows in part the configuration of the cam arrangement employed in the embodiment of FIG. 4, FIG. 6 shows a further embodiment of the invention in which the cylinders are arranged parallel to the axes of the driving and driven shafts and in addition the driving shaft extends within a hollow driven shaft.

Figure 7:
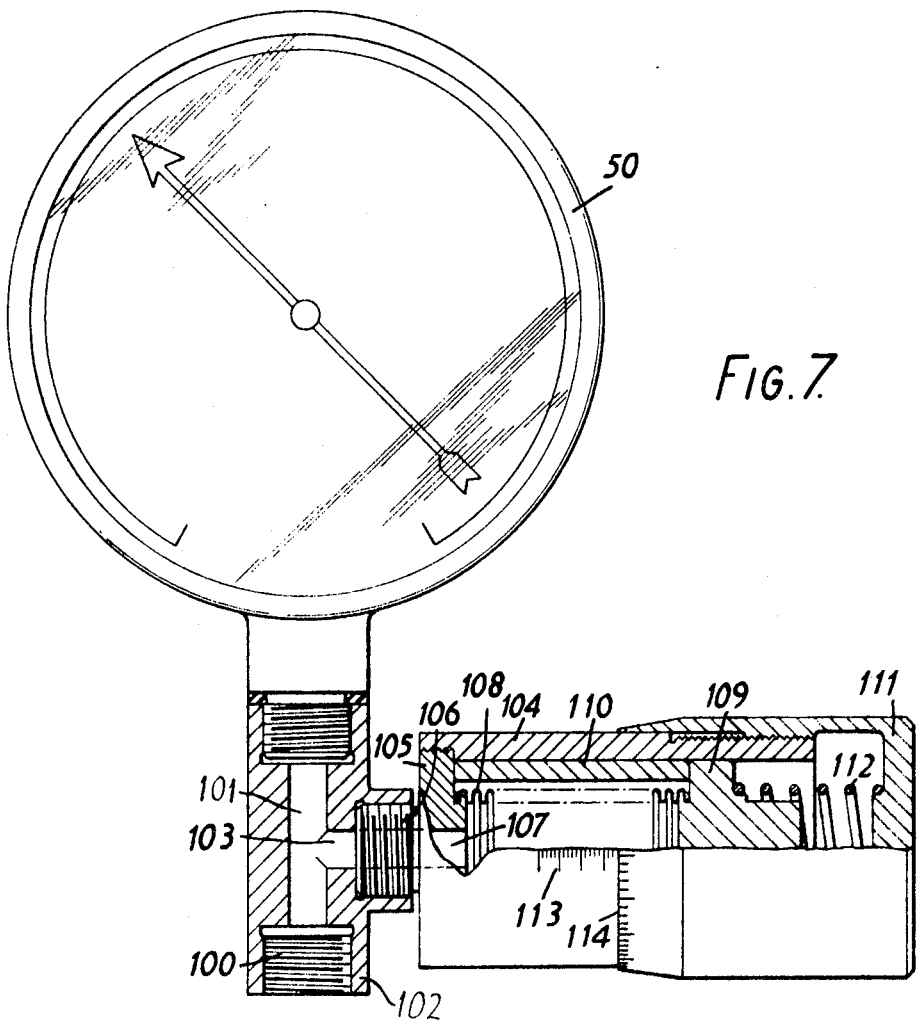
Figure 8:
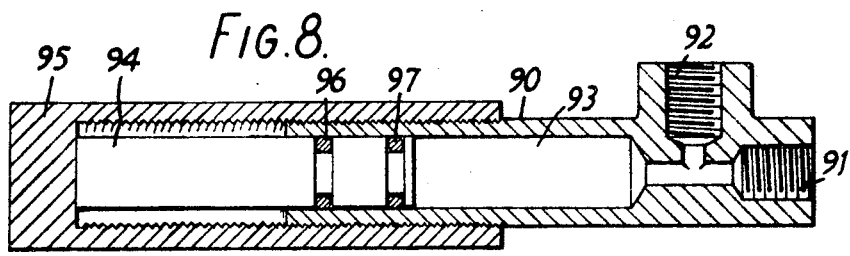

FIG. 7 shows control means employed when the device is to be used for torque limitation purposes, and FIG. 8 shows control means employed when the device is to be used as a fluid clutch.

Referring now to the drawings and more particularly to FIGS. 1 and 2, the torque transmission device comprises a circular outer cover consisting of an end cover 9 and a housing 10, the casing having circular recesses 11 and 12 at each end for the reception of bearings for the driving and driven shafts. The driving shaft 13 is carried in bearings 14 and 15 in the recess 11 and is provided with a ring mounting 16 to which the cylinder assembly 17 is secured by bolts 18 of which only one is visible in the drawing. The cylinder assembly consists of a circular block 19 provided with three cylinders 20, 21 and 22 arranged radially of the driving shaft at angles of 120° about the axis of the driving shaft. The cylinders are each provided with pistons 23, 24 and 25 and the inner end of each piston is formed with a recess 26 as shown for cylinder 23. The part of the piston left after forming the recess 26 is drilled to receive a spindle 27 on which is mounted an anti-friction roller 28, the rollers 29 and 30 for the pistons 24 and 25 being shown in FIG. 2.

The driven shaft 31 is mounted in bearings 32 and 33 in the recess 12 and has attached to it a circular member 34 which is located within a circular aperture 35 in the block 19 and the recesses 26 of the pistons 23, 24 and 25. The member 34 is provided with a peripheral cam track 36 in which the rollers 28, 29 and 30 engage. The cam track has three inwardly extending depressions 37, 38 and 39 (FIG. 2) arranged at angles of 120° and under no-load conditions the rollers are positioned in the roots of the depressions as shown in FIG. 2.

The head of cylinder 20 is connected through an L-shaped duct 40 to a circular recess 41 in the block 19, the heads of the other two cylinders being similarly connected to recess 41. An annulus 42 seats within the recess 41, partially filling the recess and the annulus is provided with three longitudinal ducts at 120° separation, one for each cylinder, the duct 43 associated with cylinder 20 only being shown. The annulus 42 is held against rotation within the recess by three pins located in bores in the annulus and the recess. The bores are arranged with 120° separation and are offset with respect to the ducts 43. One pin 60 is shown in FIG. 1. The three longitudinal ducts terminate in an annular channel 44 formed in the other face of the annulus. This outer face of the annulus engages with a further annulus 45 located within a recess 46 in the end cover 9. Annulus 45 is also provided with three longitudinal ducts at 120° separation, duct 47 only being shown. A circular channel 48 coterminous with annulus 45 is provided in the end cover 9 and a duct 49 opens into the channel 48 and extends to the outside of the end cover 9. The cylinder heads and the various ducts and channels are filled with a suitable fluid and a pressure-operated indicator 50 having a gauge calibrated in torque units is connected to the outer end of duct 49. Alternatively the outer end of duct 49 may be connected to external control equipment.

In operation under no-load conditions, the driving shaft 13 is rotated and with it the block 19 comprising the cylinder assembly. Under these conditions, there is no tendency for the rollers 28, 29 and 30 to rise up the sides of the depressions 37, 38 and 39 respectively in the cam track, and the circular member 34 and hence the driven shaft 31 are rotated with the driving shaft as a single unit, there being substantially no increase in the fluid pressure. When a load is applied to the driven shaft 31, there will be a tendency for a small relative movement to take place between the driving and driven shaft due to the torque applied to the driven shaft. The rollers at the piston ends will therefore ride up one side of the depressions in the cam track and the pistons will move outwardly in the cylinders. This will decrease the volume of the space occupied by the fluid in proportion to the applied torque and consequently increase the pressure in the fluid, also in proportion to the applied torque. This increase will be indicated by the pressure-operated indicator 50. It will be understood that effectively the device converts an applied torque into a thrust proportional to the applied torque and it is the thrust that gives the indication of the torque.

It will be appreciated from the foregoing description that there will be relative movement between the annuli 42 and 45 at the engaging faces thereof and there is therefore a possibility of a fluid leak here. This is overcome by spring-loading the outer face of annulus 42 against the outer face of annulus 45 as shown in FIG. 3. The annulus 42 is provided on its inner face with three recesses with 120° separation and offset with respect to the ducts 43, one recess 51 being shown in FIG. 3. A helical spring 52 is located between the base of the recess 51 and the base of the recess 41 in which the annulus 43 is positioned. Additionally the opposing faces of the annuli have a lapped finish. Leakage longitudinally of the annuli is prevented by the provision of "O" rings 53, 54, 55 and 56. The annulus 42 is made of brass or bronze and the annulus 45 of hardened steel. The only other possibility of fluid leakage is between the cylinder bores 20, 21 and 22 and the respective pistons 23, 24 and 25 and this is prevented by closing the outer ends of the cylinders with a diaphragm 57, preferably made of rubber. The block 19 is formed in two parts and the lower part is provided with a circular recess 58 for the reception of a peripheral flange 59 on the diaphragm, the latter being kept in place by the securing of the upper part to the lower part. With these arrangements the possibility of fluid leakage to an extent which reduces the accuracy of the device is prevented.

The embodiment shown in FIG. 4 of the drawings is similar to that shown in FIG. 1 but is of more compact construction in that the cylinders are arranged parallel to the axes of the shafts instead of radially as in FIG. 1. In view of the similarity between the two embodiments, the same parts are given the same references in FIGS. 1 and 4.

Referring now to FIG. 4, the driving shaft 13 is carried in bearings 14 and 15 in the recess 11 and the cylinder assembly 17 is bolted by bolts 80 to the end of the driving shaft so that the assembly engages with an annular ring 81, fixed to the driving shaft. The cylinder assembly consists of a block 19 provided with three cylinders arranged with their axes parallel to the driving shaft, the cylinders being arranged at 120° separation about the axis of the driving shaft. Only one of the cylinders, 20, is shown in FIG. 4, the other two being arranged similarly to those shown in FIG. 2 of the previously described embodiment. The cylinders are each provided with pistons, such as piston 23 in cylinder 20, and the right-hand end of each piston is provided with a slot 82 for the reception of an anti-friction roller 83. The latter is maintained in position by providing a transverse hole 84 at right angles to the slot 82, the hole receiving an insert 85 through which screw 86 passes into a threaded hole in the center of the boss of the roller.

The driven shaft 31 is mounted in bearings 32 and 33 in the recess 12 and has keyed to it the circular member 87 which is provided with a face cam 88 engaging with the anti-friction rollers as shown in FIG. 5 for roller 83. The face cam has three inwardly extending depressions arranged at angles of 120° about the axis of the driven shaft and under no-load conditions, the rollers are positioned in the roots of the depressions.

The outer end of each of the cylinders is again closed by a diaphragm 57, preferably of rubber, secured in position in a similar way to that shown in FIG. 1. Each cylinder head is again connected by an L-shaped duct 40 to a recess 41 which houses the annulus 42. The annulus 42 has three longitudinal ducts at 120° separation, one for each cylinder, the duct 43 for cylinder 20 only being shown. The three longitudinal ducts terminate in an annular channel 44 in the outer face of the annulus. The annulus 42 is maintained against rotation within the recess in the same way as that shown in FIG. 1. The outer face of the annulus 42 engages with a second annulus 45 located within recess 46 in the end cover 9, the annulus 42 being spring-urged against annulus 45 in the manner described with reference to FIG. 1. Annulus 45 is also provided with three longitudinal ducts at 120° separation about the axis of the driving shaft, duct 47 only being shown. A circular channel 48 coterminous with annulus 45 is provided in the end cover 9 and a duct 49 opens into a channel 48 and extends to the outside of the end cover. The cylinder heads and the various ducts are again filled with a suitable fluid and an indicator or control equipment is connected to the outer end of duct 49.

It will be understood that with the axial arrangement of the cylinders, there will be a thrust between the driving and driven shafts which necessitates the provision of a thrust bearing 89 between the two shafts.

The device shown in FIG. 4 operates in a similar manner to that described with reference to the embodiment of FIG. 1. That is, under no-load conditions, the driving and driven shafts rotate as a single unit, the anti-friction rollers remaining in the roots of the depressions in the cam face. When a load is applied to the driven shaft, the rollers will ride up one side of the depressions in the cam face and the pistons will move towards the left as shown in the drawing to increase the pressure in the fluid in proportion to the applied torque. This increase will be indicated by the indicator connected to duct 49 or will exert a control of whatever equipment is connected to the duct.

A further embodiment of the invention is shown in FIG. 6 which is similar to FIG. 4 in that the pistons are arranged with their axes parallel to the axis of the shafts. However, in this embodiment the coaxial driving and driven shafts are arranged one within the other to give an even more compact construction than that shown in FIG. 4. This embodiment is particularly suitable for use in transmitting a drive from, for example, a motor. In view of the similarity between the embodiments shown in FIGS. 4 and 6, the same parts are given the same references in the two drawings.

Referring now to FIG. 6, the driving shaft 13 is hollow and is mounted on the motor shaft (not shown) on which it fits. The outer casing is supported on the driving shaft 13 by the bearing 32 and the hollow driven shaft 31 is supported on the driving shaft by bearings 70 and 71. The cylinder assembly 19 is keyed on to the driving shaft 13 and the cylinders are arranged parallel to the axes of the shafts. As in FIG. 1, only one cylinder, 20, is shown in FIG. 6, the other two cylinders being arranged at 120° with respect to cylinder 20 in the manner shown in FIG. 2. The cam arrangement takes the form of a face cam 72 which has the same configuration as the face cam 88 shown in FIG. 5, the rollers 83 resting in the no-load condition in the roots of the depressions in the face cam.

The outer end of each of the cylinders is again closed by a diaphragm 57, preferably of rubber, secured in position in a similar way as that shown in FIG. 1. Each cylinder head is again connected by an L-shaped duct 40 to a recess 41 which houses the annulus 42. The annulus 42 has three longitudinal ducts at 120° separation, one for each cylinder, the duct 43 associated with cylinder 20 only being shown. The three longitudinal ducts terminate in an annular channel 44 in the outer face of the annulus. The annulus 42 is maintained against rotation within the recess in the same way as that shown in FIG. 1. The outer face of the annulus 42 engages with a second annulus 45 located within recess 46 in the outer casing 10, the annulus 42 being spring-urged against annulus 45 in the manner described with reference to FIG. 1. Annulus 45 is also provided with three longitudinal ducts at 120° separation, duct 47 only being shown. A circular channel 48 coterminous with annulus 45 is provided in the casing and a duct 49 opens into channel 48 and extends to the outside of the casing. The cylinder heads and the various ducts and channels are filled with a suitable fluid and an indicator or control equipment is connected to the outer end of duct 49. A thrust bearing 89 is again provided between the driving and driven shafts.

The operation of the embodiment shown in FIG. 6 is the same as that described relative to FIGS. 1 and 4 and no further description of the operation is thought to be necessary.

When the device described is provided with an indicator calibrated in torque units, it operates as a torque sensing device. It can, however, easily be adapted to a torque limiting device by the provision of means which, at a predetermined value of the fluid pressure, operate to increase the volume occupied by the fluid and hence reduce the pressure. The reduction in pressure must be such as to enable the rollers at the ends of the cylinders to rise out of the depressions in the cam arrangement, the drive between the driving and driven shafts being then disconnected. The cylinder assembly will, of course, continue to rotate but the rollers at the piston ends will merely follow the outline of the cam arrangement without imparting any drive through the cam arrangement to the driven shaft. The means for pressure reduction could take many forms and may, for instance, be a relief valve. A preferred form is, however, the arrangement shown in FIG. 7 which incorporates a metallic bellows. Thus referring to FIG. 7, the apparatus shown is for connection to the duct 49 of any of the embodiments shown in FIGS. 1, 4 and 6, the connection being made to the bore 100 which connects through duct 101 in the body 102 to the indicating instrument 50. A branch duct 103 leads to the torque limiting arrangement. This comprises a cylindrical tube 104 having a closure plate 105, a reduced portion 106 of which is provided with a duct 107 in alignment with the duct 103. A metallic bellows 108 is secured, for instance by soldering, to the inner face of the closure plate 105, the other end of the bellows being similarly secured to member 109 which is slidable within the bore of the tube. A split cylinder 110 is provided in the bore of the tube between the plate 105 and the member 109. A closure cap 111 is provided at the other end of the tube, the cap being internally threaded to co-operate with an externally threaded portion of the tube. A calibrated helical spring 112 is located in the space between the slidable member 109 and the inner face of the closure cap.

In operation, the spring 112 exerts a pressure against the slidable member 109 and in the no-load condition this pressure is sufficient to maintain the slidable member in the position shown in the drawing, compression of the bellows being restricted by the cylinder 110. Under load conditions, the pressure within the bellows increases and when this pressure exceeds that exerted by the spring 112, the slidable member 109 moves to the right. The bellows thereupon expands and increases the volume occupied by the fluid. The rollers at the ends of the cylinders thereupon rise out of the depressions in the cam arrangement and the drive between the driving and driven shafts is disconnected.

It will be understood that the pressure exerted by spring 112 on the slidable member 109 may be varied by screwing the closure cap 111 either inwardly or outwardly and micrometer type scales 113 and 114 are provided on the outer surface of the tube 104 and the edge of the closure cap 111 to enable accurate setting of the limiting torque.

The feature of torque limitation can also be adapted to provide a fluid clutch by the addition of the control means shown in FIG. 8 which serves to vary the volume occupied by the fluid and hence the fluid pressure. This consists of a casing 90 having an inlet 91 which is connected to the duct 49 (FIG. 1), an outlet 92 which is connected to a pressure-operated indicator and a fluid reservoir 93 in communication with the inlet 91 and outlet 92. The fluid reservoir 93 is closed by a plug 94 carried by an internally threaded cylindrical closure 95 which is screwed on to the externally threaded casing 90, fluid seals 96 and 97 preventing any fluid leakage from the reservoir past the plug. It will be appreciated that unscrewing the plug from the reservoir will increase the volume occupied by the fluid and a point will be reached where the rollers ride out of the depressions in the cam arrangement due to the decrease of pressure in the fluid and as previously described the drive between the driving and driven shafts is disconnected. A clutching action is thereby obtained. Preferably the scale of the indicator connected to outlet 92 has an adjustable distinctive marking to indicate the limiting torque.

It will, of course, be understood that the device shown in FIG. 8 may take other forms. For instance, the plug may be lever operated between two positions or may be pedal-operated although in both these cases it may be desirable in view of the small movement required by the plug to introduce some form of reduction gear.

The previously described embodiments are given by way of example only and many modifications may be made by those skilled in the art without departing from the invention. Thus although a single cylinder could be used, this would involve balancing the block and the use of three cylinders as shown is obviously more satisfactory. However, a number other than three could also be used. It will also be understood that increasing the number of cylinders would amplify the pressure increase for a given rise of the rollers out of the depressions on the cam plate. It is therefore possible to design a standard cylinder and piston and to use different numbers of these in accordance with the type of apparatus required. However, it will be understood that the design of a transmission device to fit a particular specification may require cylinders other than such standard cylinders. Furthermore, the device has a design flexibility in other respects because, within practical limits, the dimensions may be varied at will.

One of the important advantages of the device disclosed in FIGS. 1, 4 and 6 is the fact that there is minimum contact between the fluid and the stationary casing 10. This as previously mentioned only occurs where duct 44 annuli 42 and 45 engage and the described arrangements of these two annuli are sufficient to prevent fluid leakage to an extent which would reduce the accuracy of the device.

It will be understood that the limiting torque and clutch aspects of the invention have very valuable application to automatic control systems of the sequencing type in which case the necessary reduction in fluid pressure would be controlled by a suitable valve or like device.

We claim:

1. A torque transmission device comprising a casing, a first and a second shaft mounted in axial alignment in said casing, an assembly attached to said first shaft and provided with a plurality of cylinders for the reception of liquid, a piston in each of said cylinders, a cam arrangement attached to said second shaft arranged to effect simultaneous and similar movement of the pistons in the cylinders on relative rotation between the two shafts, an outlet in said casing, a passage connecting all the cylinder heads with said outlet, and yieldable means attached to said outlet for confining said liquid in an enclosure of variable volume.

2. A torque transmission device as claimed in claim 1, and means responsive to enlargement of said enclosure for disconnecting the drive between said first and second shafts.

3. A torque transmission device as claimed in claim 2, the last-named means comprising a metallic bellows connected to said outlet and spring means acting on said bellows to prevent expansion thereof until a predetermined increase in the fluid pressure occurs.

4. A torque transmission device as claimed in claim 3, and means for adjusting the pressure exerted on the bellows by said spring means thereby enabling the value of the limiting torque to be varied.

5. A torque transmission device as claimed in claim 1, said cylinders being equally spaced about the axes of the shafts.

6. A torque transmission device as claimed in claim 1, wherein a plurality of cylinders is formed in said assembly, the cylinder axes being radial with respect to the axes of the shafts.

7. A torque transmission device as claimed in claim 6, wherein the cam arrangement consists of a cam track provided in a member secured to said second shaft, the pistons being provided with anti-friction rollers which under no-load conditions engage in the roots of inwardly extending depressions in the cam track.

8. A torque transmission device as claimed in claim 1, wherein a plurality of cylinders is formed in said assembly, the cylinder axes being parallel to the axes of the shafts.

9. A torque transmission device as claimed in claim 8, wherein the cam arrangement consists of a face cam provided on a member secured to said second shaft, the pistons being provided with anti-friction rollers which under no-load conditions engage in the roots of depression in the face cam which extend away from the pistons.

10. A torque transmitting device comprising a first shaft, a second shaft in axial alignment with said first shaft, an assembly attached to said first shaft, a plurality of cylinders in said assembly equally spaced around the axes of said shafts, a piston in each of said cylinders, an outlet, yieldable means connected to said outlet for confining said liquid in an enclosure of variable volume, a liquid-filled passage connecting said cylinders with said outlet thereby to form an internally closed system for the liquid and a cam arrangement attached to said second shaft, the cam arrangement under load conditions effecting simultaneous and similar movement of the pistons in the cylinders and movement of the liquid through said outlet until the pressure exerted by the liquid on the yieldable means balances the torque applied to said second shaft whereupon a direct drive obtains between said first and second shafts.

* * * * *